US011782450B2

(12) United States Patent
Shao

(10) Patent No.: US 11,782,450 B2
(45) Date of Patent: Oct. 10, 2023

(54) AUTOMATIC DEVIATION CORRECTION CONTROL METHOD FOR HOISTING SYSTEM

(71) Applicant: Shanghai Master Matrix Information Technology Co., Ltd., Shanghai (CN)

(72) Inventor: En Shao, Shanghai (CN)

(73) Assignee: Shanghai Master Matrix Information Technology Co., Ltd., Shanghai (CN)

(*) Notice: Subject to any disclaimer, the term of this patent is extended or adjusted under 35 U.S.C. 154(b) by 0 days.

(21) Appl. No.: 17/798,977

(22) PCT Filed: Feb. 26, 2021

(86) PCT No.: PCT/CN2021/078136
§ 371 (c)(1),
(2) Date: Aug. 11, 2022

(87) PCT Pub. No.: WO2021/175164
PCT Pub. Date: Sep. 10, 2021

(65) Prior Publication Data
US 2023/0060836 A1 Mar. 2, 2023

(30) Foreign Application Priority Data
Mar. 4, 2020 (CN) .......................... 202010141160.3

(51) Int. Cl.
*G01D 1/02* (2006.01)
*G05D 1/02* (2020.01)
(52) U.S. Cl.
CPC ... *G05D 1/0214* (2013.01); *G05D 2201/0205* (2013.01)
(58) Field of Classification Search
CPC ......... G05D 1/0214; G05D 2201/0205; G05D 1/0212; B66C 13/085; B66C 13/22
(Continued)

(56) References Cited

U.S. PATENT DOCUMENTS

| 5,610,816 A * | 3/1997 | Kim ........................ B66C 9/16 |
| | | 318/587 |
| 2014/0299564 A1* | 10/2014 | Lin ........................ G01B 21/22 |
| | | 33/343 |
| 2019/0129443 A1* | 5/2019 | Leclair ................. G05D 1/0259 |

FOREIGN PATENT DOCUMENTS

| CN | 203976241 U | 12/2014 |
| CN | 105776027 A | 7/2016 |

(Continued)

OTHER PUBLICATIONS

International Search Report and Written Opinion for International Application No. PCT/CN2021/078136, dated Apr. 28, 2021, 7 pages.

*Primary Examiner* — Mahmoud S Ismail
(74) *Attorney, Agent, or Firm* — NSIP Law

(57) ABSTRACT

The present invention provides an automatic deviation correction control method for a hoisting system, comprising the following steps: obtaining a lateral displacement X and an advancing included angle α generated by the deflection of the hoisting system; when the lateral displacement X is not 0 and the advancing included angle α is not 0, determining whether the lateral displacement X and the advancing included angle α satisfy a preset condition; if the lateral displacement X and the advancing included angle α do not satisfy the preset condition, controlling the hoisting system to correct the deviation toward a center line; and if the lateral displacement X and the advancing included angle α satisfy the preset condition, controlling the hoisting system to correct the deviation toward the center line in a reverse direction.

9 Claims, 6 Drawing Sheets

(58) Field of Classification Search
USPC .......................................................... 701/400
See application file for complete search history.

(56) References Cited

FOREIGN PATENT DOCUMENTS

| | | |
|---|---|---|
| CN | 106275066 A | 1/2017 |
| CN | 107544520 A | 1/2018 |
| CN | 107943020 A | 4/2018 |
| CN | 109399464 A | 3/2019 |
| CN | 110980525 A | 4/2020 |

\* cited by examiner

AUTOMATIC DEVIATION CORRECTION CONTROL METHOD FOR HOISTING SYSTEM

CROSS-REFERENCE TO RELATED APPLICATIONS

This is a national phase of International Application No. PCT/CN2021/078136, filed 26 Feb. 2021, which claims priority to Chinese Application No. 202010141160.3, filed 4 Mar. 2020. The disclosure of each of these applications is incorporated herein by reference in its entirety for all purposes.

TECHNICAL FIELD

The present invention relates to the field of hoisting system transportation, and more particularly to an automatic deviation correction control method for a hoisting system.

BACKGROUND ART

Port operation refers to the operation of dispatching, loading and unloading goods, removing obstacles, etc. when ships enter and leave the port. The port operation is basically carried out with the hoisting system of large mobile and fixed machinery such as trailers, forklifts and cranes as the main tools. Because the performance of the two frequency converters that drive the tires on both sides of the hoisting system cannot reach the same level, and the installation accuracy of large machinery and the flatness of the ground on the operation site, it is easy to deviate in the process of this kind of advance, resulting in the deviation of advancing included angle and lateral displacement from the specified central route. Therefore, the deviation correction of the hoisting system is particularly important in operation. Under manual operation, the driver often needs to correct the deviation manually, and the automatic deviation correction function of the hoisting system is an important means to reduce accident risk and improve operation efficiency. The hoisting system of the port terminal operation relies on the velocity difference of the tires on both sides of the body to correct the deviation. Considering the safety of the rigid structure of the hoisting system, the velocity difference of the tires on both sides can not be changed at will, so it is difficult to use the existing control algorithm to correct the deviation.

Accordingly, there is a need to provide an automatic deviation correction control method for a hoisting system, which can implement automatic deviation correction for the hoisting system, reducing the workload of a driver during work.

SUMMARY OF THE INVENTION

The technical problem to be solved by the present invention is to provide an automatic deviation correction control method for a hoisting system, which can implement automatic deviation correction for the hoisting system by controlling the lateral displacement and the advancing included angle, reducing the workload of a driver during work.

The technical solution adopted by the present invention to solve the above technical problem is to provide an automatic deviation correction control method for a hoisting system, characterized in that comprising the following steps:
  obtaining a lateral displacement X and an advancing included angle $\alpha$ generated by the deflection of the hoisting system, the lateral displacement X is the distance between the real-time position of the hoisting system and a center line, the advancing included angle $\alpha$ is an included angle between the real-time position of the hoisting system and the center line;
  when the lateral displacement X is 0 and the advancing included angle $\alpha$ is also 0, maintaining the hoisting system a straight-line travel, if the advancing included angle $\alpha$ is not 0, controlling the hoisting system to correct the deviation toward the center line so that the advancing included angle $\alpha$ tends to 0;
  when the lateral displacement X is not 0 and the advancing included angle $\alpha$ is 0, controlling the hoisting system to correct the deviation toward the center line;
  when the lateral displacement X is not 0 and the advancing included angle $\alpha$ is also not 0, determining whether the lateral displacement X and the advancing included angle $\alpha$ satisfy a preset condition, if the lateral displacement X and the advancing included angle $\alpha$ do not satisfy the preset condition, controlling the hoisting system to correct the deviation toward the center line; and if the lateral displacement X and the advancing included angle $\alpha$ satisfy the preset condition, controlling the hoisting system to correct the deviation toward the center line in a reverse direction;
  the preset condition comprising the lateral displacement X and the advancing included angle $\alpha$ of the hoisting system satisfies the following condition:

$$X \leq R_1(1-\cos\alpha)$$

wherein a sensor is provided on a first side wheel of the hoisting system for detecting the lateral displacement X and the advancing included angle $\alpha$, $R_1$ is the rotation radius of the first side wheel of the hoisting system. Optionally, when the lateral displacement X is not 0 and the advancing included angle $\alpha$ is also not 0, if the lateral displacement X and the advancing included angle $\alpha$ do not satisfy the preset condition, controlling the hoisting system to correct the deviation toward the center line comprising controlling the hoisting system to correct the deviation toward the center line to a first position, the first position satisfies the following condition:
  the advancing included angle $\alpha$ is 0, and the lateral displacement X reaches a maximum value.

Optionally, controlling the hoisting system to correct the deviation toward the center line to a second position, the second position satisfies the following condition:

$$X = R_1(1-\cos\alpha)$$

when the hoisting system travels from the first position to the second position, the absolute value of the advancing included angle $\alpha$ gradually increases, and the lateral displacement X gradually decreases.

Optionally, if the lateral displacement X and the advancing included angle $\alpha$ satisfy the preset condition, controlling the hoisting system to correct the deviation toward the center line in a reverse direction comprising controlling the hoisting system to correct the deviation toward the center line to a third position, at this time, the deviation correction is completed, controlling the hoisting system maintaining a straight-line travel, and the third position satisfies the following condition:
  the advancing included angle $\alpha$ is 0, and the lateral displacement X is also 0.

Optionally, when controlling the hoisting system to correct the deviation toward the center line to the first position, the lateral displacement X satisfies the following condition:

$$X_1 = X_0 + R_1(1 - \cos \alpha_0)$$

wherein, $X_1$ is the lateral displacement of the hoisting system at the first position, $X_0$ is the lateral displacement of the hoisting system at an initial position, $R_1$ is the rotation radius of the first side wheel of the hoisting system, and $\alpha_0$ is the advancing included angle of the hoisting system at the initial position.

Optionally, when controlling the hoisting system to correct the deviation toward the center line to the second position, the lateral displacement X satisfies the following condition:

$$X_2 = X_1 - R_1(1 - \cos \alpha_2)$$

and $\alpha_2$ satisfies the following condition:

$$\alpha_2 = \frac{V_1 t_2}{R_1} = \frac{V_2 t_2}{R_2}$$

wherein, $X_2$ is the lateral displacement of the hoisting system at the second position, $X_1$ is the lateral displacement of the hoisting system at the first position, $R_1$ is the rotation radius of the first side wheel of the hoisting system, $R_2$ is the rotation radius of the second side wheel of the hoisting system, $t_2$ is the time it takes for the hoisting system to travel from the first position to the second position, $V_1$ is the velocity of the first side wheel of the hoisting system, $V_2$ is the velocity of the second side wheel of the hoisting system, and $\alpha_2$ is the advancing included angle of the hoisting system at the second position.

Optionally, when the lateral displacement of the hoisting system at an initial position satisfies the following conditions:

$$X > R_1(1 - \cos \alpha)$$

the travel route of the hoisting system is an S-curve.

Optionally, controlling the hoisting system to correct the deviation toward a center line comprising sending deviation rectification control commands to the hoisting system by using an industrial computer.

Optionally, the hoisting system comprises a crane, which comprises a tire crane, a straddle carrier and a stacker.

Compared to the prior art, the technical solutions of embodiments of the present invention have the following advantageous effects.

An automatic deviation correction control method for a hoisting system provided by the present invention covering various application scenarios of the hoisting system during the traveling process, and determining the applicable application scenarios of the hoisting system during the current traveling process by obtaining the lateral displacement and the advancing included angle of the hoisting system. When the lateral displacement X is 0 and the advancing included angle $\alpha$ is also 0, maintaining the hoisting system a straight-line travel, if the advancing included angle $\alpha$ is not 0, controlling the hoisting system to correct the deviation toward the center line so that the advancing included angle $\alpha$ tends to 0. When the lateral displacement X is not 0 and the advancing included angle $\alpha$ is also not 0, determining whether the lateral displacement X and the advancing included angle $\alpha$ satisfy a preset condition, if the lateral displacement X and the advancing included angle $\alpha$ do not satisfy the preset condition, controlling the hoisting system to correct the deviation toward the center line; and if the lateral displacement X and the advancing included angle $\alpha$ satisfy the preset condition, controlling the hoisting system to correct the deviation toward the center line in a reverse direction until the lateral displacement and the advancing included angle are both 0, then the deviation correction is completed, and controlling the hoisting system maintaining a straight-line travel. The control method is particularly efficient and has low computational complexity. Once the lateral displacement X and the advancing included angle $\alpha$ satisfy the preset condition, it will immediately trigger controlling the hoisting system to correct the deviation toward the center line in a reverse direction, quickly correcting the deviation of the hoisting system back to the center line in no more than twenty seconds, thereby implementing the automatic deviation correction of the hoisting system, and then effectively reducing the workload of a driver during work, laying a foundation for the unmanned operation of the port terminal.

DETAILED DESCRIPTION OF THE INVENTION

The present invention will be further described below in combination with the accompanying drawings and embodiments.

In the following description, many specific details are set forth in order to provide a thorough understanding of the present invention. However, it will be apparent to those skilled in the art that the present invention can be practiced without these specific details. Therefore, the specific details are only exemplary, and the specific details may vary from the spirit and scope of the unrestrained and are still considered to be within the spirit and scope of the present invention.

The hoisting system in this embodiment can be used for port logistics. The hoisting system includes a crane, which includes but is not limited to a tire crane, a straddle carrier and a stacker. The following takes a tire crane as an example to illustrate the working principle of the automatic deviation correction control method of the hoisting system of the present invention.

Figure 1:
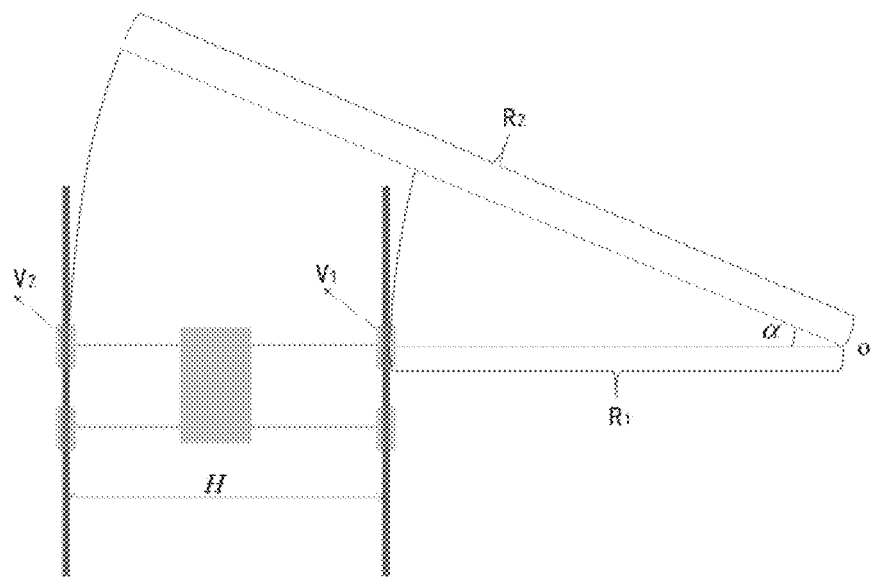
FIG. 1 is an operation diagram of a hoisting system in the prior art.

Now refer to FIG. 1, which is an operation diagram of a hoisting system in the prior art. The right wheel of the tire crane is set as a first side wheel, the left wheel of the tire crane is set as a second side wheel, the velocity of the right wheel of the tire crane is set as $V_1$, and the velocity of the left wheel is set as $V_2$. In actual use, the right wheel of the tire crane can also be set as the second side wheel, and the left wheel of the tire crane can be set as the first side wheel, which will not be repeated here.

During the operation, the tire crane should have travelled along the planned parallel route, but due to the different performance of the frequency converter and the flatness of the road, the velocity of the tires on both sides is not equal, that is, $V_1 \neq V_2$. The tire crane will make a circular motion with O as the center. As shown in FIG. 1, the motion radius of the right wheel of the tire crane, that is, the first side wheel, is set as $R_1$, and a sensor is provided on the first side wheel detecting the lateral displacement X and the advancing included angle $\alpha$. The motion radius of the left wheel of the tire crane, that is, the second side wheel, is set as $R_2$. No sensor is provided on the second side wheel detecting the lateral displacement X and the advancing included angle $\alpha$. In actual use, the sensor can also be provided on the left side wheel of the hoisting system, that is, the second side wheel, which will not be repeated here.

Assuming that the width of the tire crane body is H, the movement angle is $\alpha$, the following formula can be obtained:

$$R_2 - R_1 = H$$

$$V_2 t = R_2 \alpha$$

$$V_1 t = R_1 \alpha$$

From the above formula, the following formula can be obtained:

$$R_2 = \frac{HV_2}{V_2 - V_1}$$

$$R_1 = \frac{HV_1}{V_2 - V_1}$$

Figure 2:
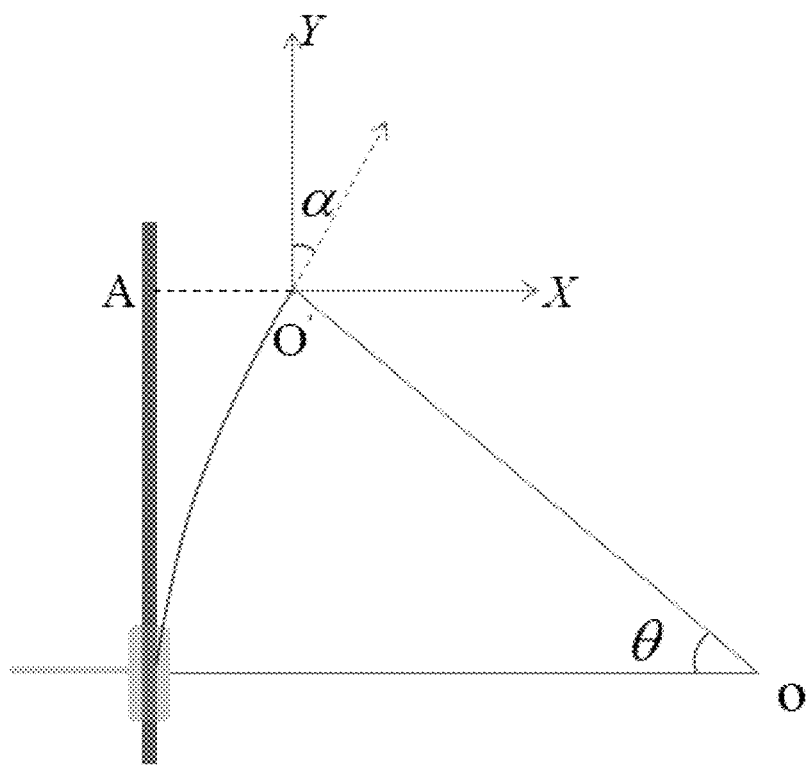
FIG. 2 is a deflection diagram of a hoisting system in the prior art.

Now refer to FIG. 2, which is a deflection diagram of a hoisting system in the prior art. With the track line as the Y axis and the vertical to the track line as the X axis, a rectangular coordinate system is established. Without deviation correction, the running time of the tire crane is t and the advancing direction is deflected $\theta$, the lateral displacement is O'A, and the values of the advancing included angle $\alpha$ and $\theta$ are equal, the following formula can be obtained:

$$\alpha = \frac{V_2 t}{R_2} = \frac{V_1 t}{R_1}$$

$$O'A = R_1(1 - \cos\alpha)$$

Figure 3A:
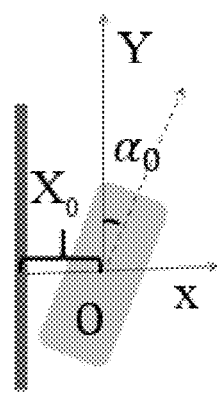
FIG. 3A, FIG. 3B, FIG. 3C, FIG. 3D, FIG. 3E, FIG. 3F, FIG. 3G FIG. 3H, FIG. 3I are deflection diagrams of a hoisting system in the prior art.
Figure 3B:
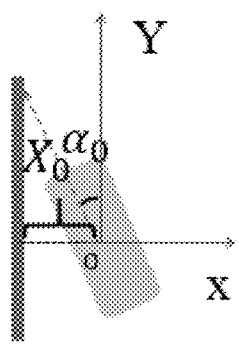
Figure 3C:
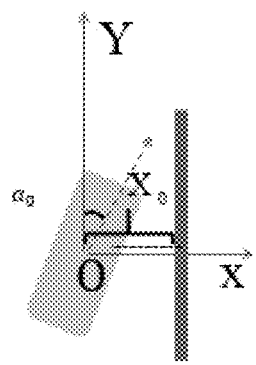
Figure 3D:
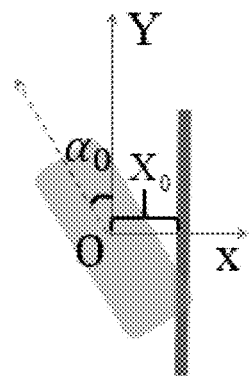
Figure 3E:
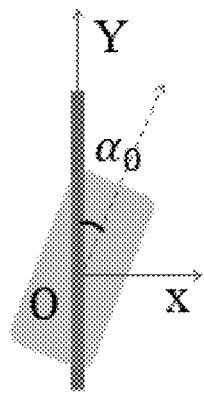
Figure 3F:
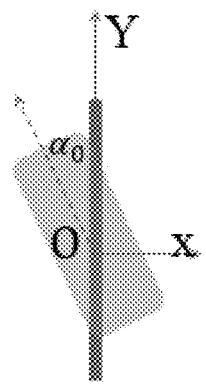
Figure 3G:
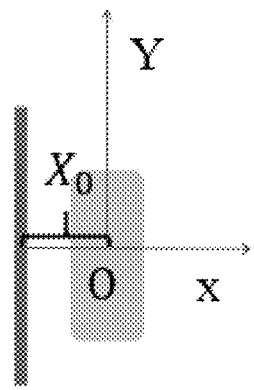
Figure 3H:
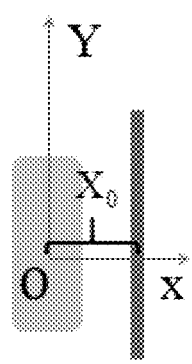
Figure 3I:
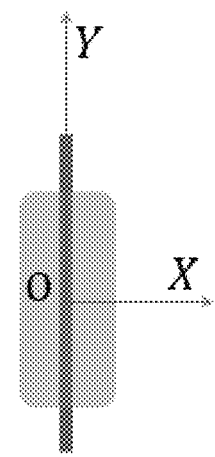

Now refer to FIG. 3A-3I, which are deflection diagrams of a hoisting system in the prior art. The deflection of the tire crane results in the lateral displacement X and the advancing included angle $\alpha$. The combination of the lateral displacement X and the advancing included angle $\alpha$ can produce nine cases. With the track line as the Y axis and the vertical to the track line as the X axis, a rectangular coordinate system is established, and the following deflection cases can be obtained. FIG. 3A: the lateral displacement X is positive, and the advancing included angle $\alpha$ is positive; FIG. 3B: the lateral displacement X is positive, and the advancing included angle $\alpha$ is negative; FIG. 3C: the lateral displacement X is negative, and the advancing included angle $\alpha$ is positive; FIG. 3D: the lateral displacement X is negative, and the advancing included angle $\alpha$ is negative; FIG. 3E: the lateral displacement X is 0, and the advancing included angle $\alpha$ is positive; FIG. 3F: the lateral displacement X is 0, and the advancing included angle $\alpha$ is negative; FIG. 3G: the lateral displacement X is positive, and the advancing included angle $\alpha$ is 0; FIG. 3H: the lateral displacement X is negative, and the advancing included angle $\alpha$ is 0; FIG. 3I: the lateral displacement X is 0, and the advancing included angle $\alpha$ is 0.

As shown in FIG. 3A and FIG. 3D, the tire crane continues to deflect outward. The deviation correction method should be to correct the deviation to the center line so that the lateral displacement X and the advancing included angle $\alpha$ tends to 0.

As shown in FIG. 3B and FIG. 3C, the tire crane approaches the center line. Without any deviation correction, the lateral displacement X tends to 0, but the advancing included angle $\alpha$ can not be corrected. Therefore, it is necessary to timely correct the advancing included angle $\alpha$ to 0, so that the lateral displacement X of the tire crane be corrected to 0.

As shown in FIG. 3E and FIG. 3F, the lateral displacement X of the tire crane is 0, and the advancing included angle $\alpha$ is not 0, it is necessary to correct the deviation of the crane to the center line, so that the advancing included angle $\alpha$ tends to 0.

As shown in FIG. 3G and FIG. 3H, the advancing included angle $\alpha$ of the tire crane is 0, and the lateral displacement X is not 0. Therefore, it is necessary to correct the deviation of the tire crane to the center line.

As shown in FIG. 3I, both of the advancing included angle $\alpha$ and the lateral displacement X of the tire crane are 0, it is not necessary to correct the deviation.

Figure 4:
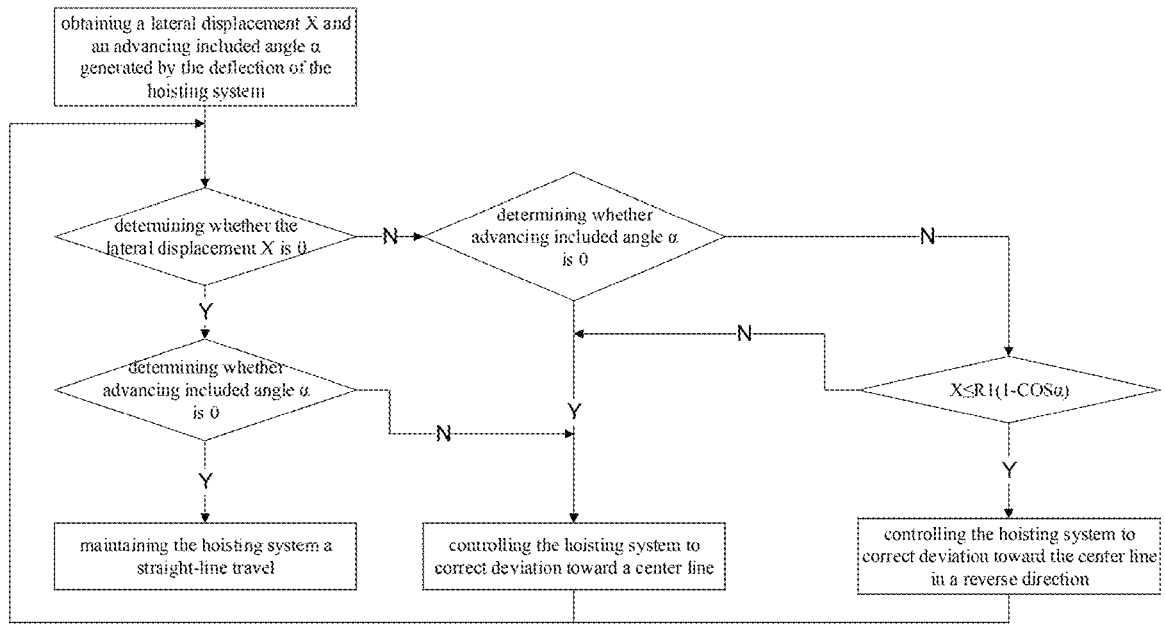
FIG. 4 is a flow chart of an automatic deviation correction control method for a hoisting system according to an embodiment of the present invention.

Now refer to FIG. 4, FIG. 4 is a flow chart of an automatic deviation correction control method for a hoisting system according to an embodiment of the present invention. An automatic deviation correction control method for hoisting system is provided by the present embodiment, comprising the following steps:

obtaining a lateral displacement X and an advancing included angle $\alpha$ generated by the deflection of the hoisting system, the lateral displacement X is the distance between the real-time position of the hoisting system and a center line, the advancing included angle $\alpha$ is an included angle between the real-time position of the hoisting system and the center line;

when the lateral displacement X is 0 and the advancing included angle $\alpha$ is also 0, maintaining the hoisting system a straight-line travel, if the advancing included angle $\alpha$ is not 0, controlling the hoisting system to correct the deviation toward the center line so that the advancing included angle $\alpha$ tends to 0;

when the lateral displacement X is not 0 and the advancing included angle $\alpha$ is 0, controlling the hoisting system to correct the deviation toward the center line;

when the lateral displacement X is not 0 and the advancing included angle $\alpha$ is also not 0, determining whether the lateral displacement X and the advancing included angle $\alpha$ satisfy a preset condition, if the lateral displacement X and the advancing included angle $\alpha$ do not satisfy the preset condition, controlling the hoisting system to correct the deviation toward the center line; and if the lateral displacement X and the advancing included angle $\alpha$ satisfy the preset condition, controlling the hoisting system to correct the deviation toward the center line in a reverse direction;

the preset condition comprising the lateral displacement X and the advancing included angle α of the hoisting system satisfies the following condition:

$X \leq R_1(1-\cos\alpha)$ wherein a sensor is provided on a first side wheel of the hoisting system for detecting the lateral displacement X and the advancing included angle α, $R_1$ is the rotation radius of the first side wheel of the hoisting system.

In a particular implementation, when the lateral displacement X is not 0 and the advancing included angle α is also not 0, if the lateral displacement X and the advancing included angle α do not satisfy the preset condition, controlling the hoisting system to correct the deviation toward the center line comprising controlling the hoisting system to correct the deviation toward the center line to a first position, the first position satisfies the following condition:

the advancing included angle α is 0, and the lateral displacement X reaches a maximum value.

In a particular implementation, controlling the hoisting system to correct the deviation toward the center line to a second position, the second position satisfies the following condition:

$X = R_1(1-\cos\alpha)$ when the hoisting system travels from the first position to the second position, the absolute value of the advancing included angle α gradually increases, and the lateral displacement X gradually decreases.

If the lateral displacement X and the advancing included angle α satisfy the preset condition, controlling the hoisting system to correct the deviation toward the center line in a reverse direction comprising controlling the hoisting system to correct the deviation toward the center line to a third position, at this time, the deviation correction is completed, controlling the hoisting system maintaining a straight-line travel, and the third position satisfies the following condition:

the advancing included angle α is 0, and the lateral displacement X is also 0.

When controlling the hoisting system to correct the deviation toward the center line to the first position, the lateral displacement X satisfies the following condition:

$X_1 = X_0 + R_1(1-\cos\alpha_0)$ wherein, $X_1$ is the lateral displacement of the hoisting system at the first position, $X_0$ is the lateral displacement of the hoisting system at an initial position, $R_1$ is the rotation radius of the first side wheel of the hoisting system, and $\alpha_0$ is the advancing included angle of the hoisting system at the initial position.

In a particular implementation, when controlling the hoisting system to correct the deviation toward the center line to the second position, the lateral displacement X satisfies the following condition:

$X_2 = X_1 - R_1(1-\cos\alpha_2)$ and $\alpha_2$ satisfies the following condition:

$$\alpha_2 = \frac{V_1 t_2}{R_1} = \frac{V_2 t_2}{R_2}$$

wherein, $X_2$ is the lateral displacement of the hoisting system at the second position, $X_1$ is the lateral displacement of the hoisting system at the first position, $R_1$ is the rotation radius of the first side wheel of the hoisting system, $R_2$ is the rotation radius of the second side wheel of the hoisting system, $t_2$ is the time it takes for the hoisting system to travel from the first position to the second position, $V_1$ is the velocity of the first side wheel of the hoisting system, $V_2$ is the velocity of the second side wheel of the hoisting system, and $\alpha_2$ is the advancing included angle of the hoisting system at the second position.

In a particular implementation, when controlling the hoisting system to correct the deviation toward the center line to the third position, the lateral displacement X is 0, and the advancing included angle α is also 0, then the deviation correction is completed, and controlling the hoisting system maintaining a straight-line travel.

Figure 5:
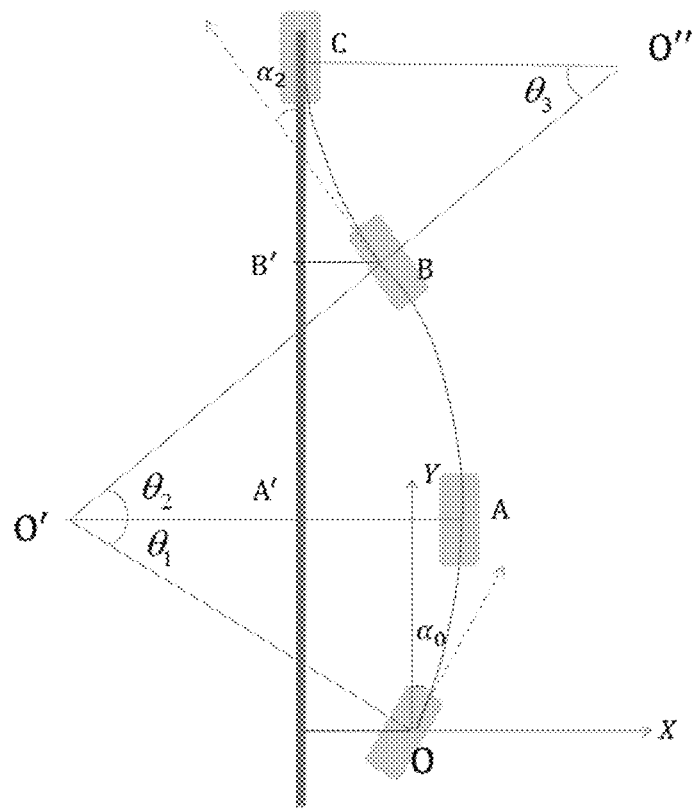
FIG. 5 is a schematic diagram of an automatic deviation correction controlling for a hoisting system according to an embodiment of the present invention.

Now refer to FIG. 5, which is a schematic diagram of an automatic deviation correction controlling for a hoisting system according to an embodiment of the present invention, that is, the schematic of the deviation in FIG. 3A. FIG. 5 is used to illustrate the specific operation of the automatic deviation correction control method of the hoisting system provided by the invention.

Taking the right side wheel of the tire crane, that is, the first side wheel, as the control target, and setting the lateral displacement of the initial position of the tire crane as $X_0$ and the advancing included angle as $\alpha_0$. Correcting the deviation of the deflection of the tire crane. The forward velocity of the right wheel and the left wheel of the tire crane are set as $V_1$ and $V_2$ respectively. The rotation radius of the first side wheel of the tire crane is set as R1, the rotation radius of the second side wheel of the tire crane is set as R2, and the body width of the tire crane is set as H. The following formula can be obtained:

$$R_1 = \left|\frac{HV_1}{V_2 - V_1}\right|$$

$$R_2 = \left|\frac{HV_2}{V_2 - V_1}\right|$$

After time $t_1$, the tire crane rotates $\theta_1$ with O' as the center, and the lateral displacement is AA', reaching the first position of point A. At point A, the tire crane is perpendicular to the X-axis, and the advancing included angle is 0. It is obvious that the values of the rotation angle $\theta_1$ and the initial advancing included angle $\alpha_0$ are equal. The following formula can be obtained:

$$\alpha_0 = \frac{V_1 t_1}{R_1} = \frac{V_2 t_1}{R_2}$$

$$AA' = X_0 + R_1(1-\cos\alpha_0)$$

At this time, the advancing included angle of the tire crane is 0, and the lateral displacement reaches the maximum value. The tire crane corrects the deviation at the same velocity. After time $t_2$, the tire crane continues to rotate $\theta_2$ with O' as the center, and the lateral displacement is BB', reaching the second position of point B, and the advancing included angle of the tire crane at point B is $\alpha_2$. It is obvious that the values of the rotation angle $\theta_2$ and the advancing included angle $\alpha_2$ are equal. The following formula can be obtained:

$$\alpha_2 = \frac{V_2 t_2}{R_2} = \frac{V_1 t_2}{R_1}$$

$$BB' = AA' - R_1(1 - \cos\alpha_2)$$

If it is needed to correct the deviation in a reverse direction at point B, that is, taking O″ as the center and $R_1$ as the radius, when the advancing included angle is 0 and the lateral displacement is also 0, the tire crane rotates $\theta_3$ with O″ as the center, reaching the third position of point C. It is obvious that the values of the rotation angle $\theta_3$ and the advancing included angle $\alpha_2$ are equal. The time of the process is $t_3$ and the lateral displacement is BB′. The following formula can be obtained:

$$R_1 = \frac{HV_1}{V_2 - V_1}$$

$$\alpha_2 = \frac{V_1 t_3}{R_1} = \frac{V_2 t_3}{R_2}$$

$$BB' = R_1(1 - \cos\alpha_2)$$

In the deviation correction process of the tire crane, at $t_2$ stage, when the following condition is met:

$$BB' = R_1(1-\cos\alpha_2)$$

It is the time to correct the deviation in a reverse direction. The following formula can be obtained:

$$BB' = R_1(1 - \cos\alpha_2) = \frac{HV_1(1 - \cos\alpha_2)}{V_2 - V_1}$$

Finally, the purpose of correcting the lateral displacement and advancing included angle at the same time. It can be seen that in FIG. 5, the lateral displacement of the hoisting system at the initial position meets the following conditions:

$$X > R_1(1-\cos\alpha)$$

Therefore, the travel route of the hoisting system is an S-curve.

It should be noted that the deviation correction process of the hoisting system in FIG. 5 has covered various application scenarios in FIG. 3, such as the application scenarios in FIG. 3A and FIG. 3D correspond to point O in FIG. 5 (FIG. 3D and FIG. 3A are located at the symmetrical position of the centerline, and the deviation correction strategy is the same). A position from point A to point C in FIG. 5 corresponds to the application scenarios in FIG. 3B and FIG. 3C (FIG. 3C and FIG. 3B are located at the symmetrical position of the centerline, and the deviation correction strategy is the same). Point C in FIG. 5 corresponds to the application scenario in FIG. 3I. FIG. 3E and FIG. 3F correspond to the application scenario that the lateral displacement X is 0, and the advancing included angle $\alpha$ is not 0, controlling to correct the deviation of the hoisting system to the center line so that the advancing included angle $\alpha$ tends to 0. FIG. 3G and FIG. 3H correspond to that the lateral displacement X is not 0, and the advancing included angle $\alpha$ is 0, controlling the hoisting system to correct deviation toward a center line.

Therefore, the application scenario in FIG. 5 covers various situation that the lateral displacement X is not 0 and the advancing included angle $\alpha$ is also not 0.

Figure 6A:
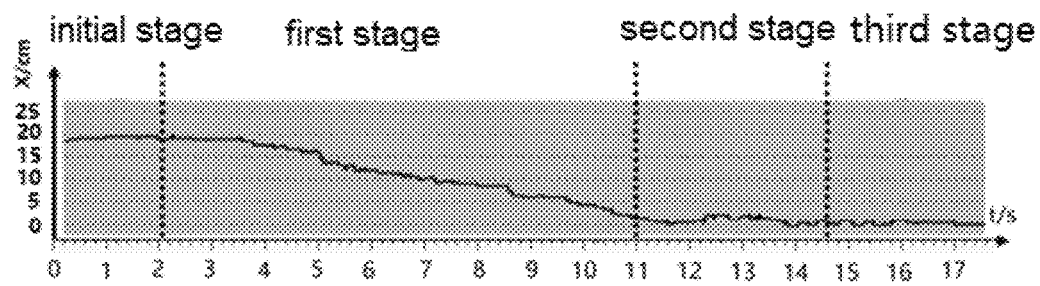
FIG. 6A, FIG. 6B, FIG. 6C are test effect diagrams of an automatic deviation correction controlling for a hoisting system according to an embodiment of the present invention.
Figure 6B:
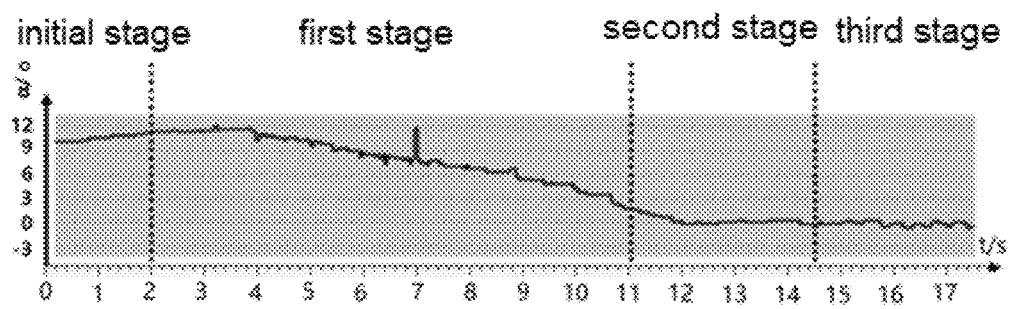
Figure 6C:
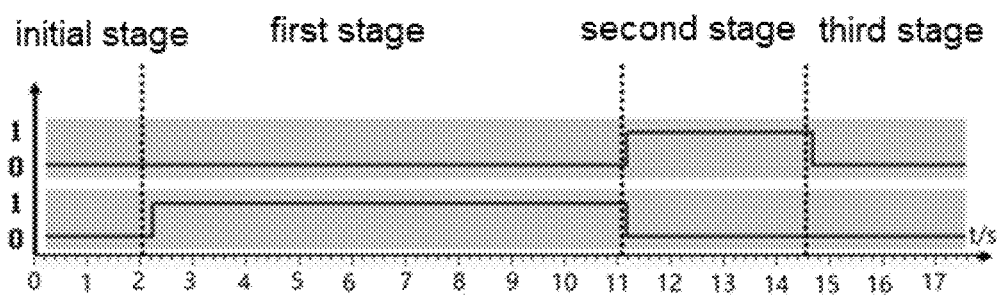

Now refer to FIG. 6A, FIG. 6B and FIG. 6C, FIG. 6A, FIG. 6B, FIG. 6C are test effect diagrams of an automatic deviation correction controlling for a hoisting system according to an embodiment of the present invention. Based on the camera installed on the front-end bracket at one side of the tire crane for deviation correction, obtaining the picture information, calculating the relationship between the current position of the tire crane and the center line, obtaining the data of the advancing included angle and lateral displacement of the tire crane. Deviation correction control commands can be sent to the hoisting system by an IPC (Industry Personal Computer). FIG. 6C shows that the control commands of the deviation correction can be sent to the hoisting system by the IPC, FIG. 6A shows the change of the lateral displacement of the hoisting system with the control command of the deviation correction, and FIG. 6B shows the change of advancing included angle of the hoisting system with the control command of the deviation correction. It is obvious that the hoisting system is in a state without deviation correction at the initial stage, the lateral displacement in FIG. 6A and the advancing included angle in FIG. 6B are seriously deviated from the center line. The lateral displacement is greater than 15 cm, and the advancing included angle is greater than 9°. The command of correcting the deviation toward the center line and the command of correcting the deviation toward the center line in a reverse direction in FIG. 6C are both 0. When the hoisting system enters the first stage, the lateral displacement is not 0, and the lateral displacement doesn't satisfy the preset condition that controlling the hoisting to correct the deviation toward the center line in a reverse, therefore, in FIG. 6C, the command of correcting the deviation toward the center line is 1, and the command of correcting the deviation to the center line in a reverse direction is 0, controlling the hoisting system to correct the deviation toward the center line, when the hoisting system is in the first stage, the lateral displacement is continuously reduced and the advancing included angle is also continuously reduced. When the hoisting system is at the end of the first stage, the lateral displacement is less than 5 cm, and the advancing included angle is less than 3°. At this time, the preset conditions for controlling the hoisting system to correct the deviation toward the center line in a reverse direction are satisfied. Therefore, the command of correcting the deviation changes. In FIG. 6C, the command of correcting the deviation toward the center line is 0, and the command of correcting the deviation toward the center line in a reverse direction is 1, entering the stage of correcting the deviation toward the center line in a reverse direction, that is, the second stage. At the end of the second stage, the values of the lateral displacement and the advancing included are stable around 0, the task of correcting the deviation is completed, entering the third stage, that is, the stage of straight ahead without correcting the deviation, at which time the deviation correction is completed.

According to the situation of the deviation correction test of the hoisting system at the initial stage, the first stage, the second stage and the third stage, through the deviation correction of 10 seconds at the first stage and the reverse deviation correction of 3.5 seconds at the second stage, at the third stage basically maintaining the hoisting system a straight-line travel. That is to say, the automatic deviation correction method of the hoisting system provided by the present embodiment can automatically correct the deviation of the hoisting system whose initial lateral displacement deviates from the center line by 15 cm back to the center line within 17 seconds. It can be seen that through the automatic deviation correction control method of the hoisting system provided by the present embodiment, the advancing included angle and lateral displacement of the hoisting system have been well corrected.

In summary, an automatic deviation correction control method for hoisting system provided by the present invention covering various application scenarios of the hoisting system during the traveling process, and determining the applicable application scenarios of the hoisting system during the current traveling process by obtaining the lateral displacement and the advancing included angle of the hoisting system. When the lateral displacement X is 0 and the advancing included angle α is also 0, maintaining the hoisting system a straight-line travel, if the advancing included angle α is not 0, controlling the hoisting system to correct the deviation toward the center line so that the advancing included angle α tends to 0. When the lateral displacement X is not 0 and the advancing included angle α is also not 0, determining whether the lateral displacement X and the advancing included angle α satisfy a preset condition, if the lateral displacement X and the advancing included angle α do not satisfy the preset condition, controlling the hoisting system to correct the deviation toward the center line; and if the lateral displacement X and the advancing included angle α satisfy the preset condition, controlling the hoisting system to correct the deviation toward the center line in a reverse direction until the lateral displacement and the advancing included angle are both 0, then the deviation correction is completed, and controlling the hoisting system maintaining a straight-line travel. The control method is particularly efficient and has low computational complexity. Once the lateral displacement X and the advancing included angle α satisfy the preset condition, it will immediately trigger controlling the hoisting system to correct the deviation toward the center line in a reverse direction, quickly correcting the deviation of the hoisting system back to the center line in no more than twenty seconds, thereby implementing the automatic deviation correction of the hoisting system, and then effectively reducing the workload of a driver during work, laying a foundation for the unmanned operation of the port terminal.

Although the present invention has been disclosed as above in a preferred embodiment, it is not intended to limit the present invention. Any person skilled in the art can make some modifications and improvements without departing from the spirit and scope of the present invention. Therefore, the scope of protection of the present invention should be subject to those defined in the claims.

The invention claimed is:

1. An automatic deviation correction control method for a hoisting system, characterized in that comprising the following steps:

obtaining a lateral displacement X and an advancing included angle α generated by a deflection of the hoisting system, the lateral displacement X is a distance between a real-time position of the hoisting system and a center line, the advancing included angle α is an included angle between the real-time position of the hoisting system and the center line;

when the lateral displacement X is 0 and the advancing included angle α is also 0, maintaining the hoisting system a straight-line travel, if the advancing included angle α is not 0, controlling the hoisting system to correct a deviation toward the center line so that the advancing included angle α tends to 0;

when the lateral displacement X is not 0 and the advancing included angle α is 0, controlling the hoisting system to correct the deviation toward the center line;

when the lateral displacement X is not 0 and the advancing included angle α is also not 0, determining whether the lateral displacement X and the advancing included angle α satisfy a preset condition, if the lateral displacement X and the advancing included angle α do not satisfy the preset condition, controlling the hoisting system to correct the deviation toward the center line; and if the lateral displacement X and the advancing included angle α satisfy the preset condition, controlling the hoisting system to correct the deviation toward the center line in a reverse direction;

the preset condition comprising the lateral displacement X and the advancing included angle α of the hoisting system satisfies a following condition:

$$X \leq R_1(1-\cos \alpha)$$

wherein a sensor is provided on a first side wheel of the hoisting system for detecting the lateral displacement X and the advancing included angle α, $R_1$ is a rotation radius of the first side wheel of the hoisting system.

2. The automatic deviation correction control method for a hoisting system according to claim 1, characterized in that when the lateral displacement X is not 0 and the advancing included angle α is also not 0, if the lateral displacement X and the advancing included angle α do not satisfy the preset condition, controlling the hoisting system to correct the deviation toward the center line comprising controlling the hoisting system to correct the deviation toward the center line to a first position, the first position satisfies the following condition:

the advancing included angle α is 0, and the lateral displacement X reaches a maximum value.

3. The automatic deviation correction control method for a hoisting system according to claim 2, characterized in that controlling the hoisting system to correct the deviation toward the center line to a second position, the second position satisfies the following condition:

$$X = R_1(1-\cos \alpha)$$

when the hoisting system travels from the first position to the second position, the absolute value of the advancing included angle α gradually increases, and the lateral displacement X gradually decreases.

4. The automatic deviation correction control method for a hoisting system according to claim 1, characterized in that if the lateral displacement X and the advancing included angle α satisfy the preset condition, controlling the hoisting system to correct the deviation toward the center line in a reverse direction comprising controlling the hoisting system to correct the deviation toward the center line to a third position, at this time, the deviation correction is completed, controlling the hoisting system maintaining a straight-line travel, and the third position satisfies the following condition:

the advancing included angle α is 0, and the lateral displacement X is also 0.

5. The automatic deviation correction control method for a hoisting system according to claim 2, characterized in that when controlling the hoisting system to correct the deviation toward the center line to the first position, the lateral displacement X satisfies the following condition:

$$X_1 = X_0 + R_1(1-\cos \alpha_0)$$

wherein, $X_1$ is the lateral displacement of the hoisting system at the first position, $X_0$ is the lateral displacement of the hoisting system at an initial position, $R_1$ is the rotation radius of the first side wheel of the hoisting system, and $\alpha_0$ is the advancing included angle of the hoisting system at the initial position.

6. The automatic deviation correction control method for a hoisting system according to claim 3, characterized in that when controlling the hoisting system to correct the deviation toward the center line to the second position, the lateral displacement X satisfies the following condition:

$$X_2 = X_1 - R_1(1 - \cos \alpha_2)$$

and $\alpha_2$ satisfies the following condition:

$$\alpha_2 = \frac{V_1 t_2}{R_1} = \frac{V_2 t_2}{R_2}$$

wherein, $X_2$ is the lateral displacement of the hoisting system at the second position, $X_1$ is the lateral displacement of the hoisting system at the first position, $R_1$ is a rotation radius of the first side wheel of the hoisting system, $R_2$ is the rotation radius of the second side wheel of the hoisting system, $t_2$ is the time it takes for the hoisting system to travel from the first position to the second position, $V_1$ is the velocity of the first side wheel of the hoisting system, $V_2$ is the velocity of the second side wheel of the hoisting system, and $\alpha_2$ is the advancing included angle of the hoisting system at the second position.

7. The automatic deviation correction control method for a hoisting system according to claim 1, characterized in that when the lateral displacement of the hoisting system at an initial position satisfies the following conditions:

$$X > R_1(1 - \cos \alpha)$$

the travel route of the hoisting system is an S-curve.

8. The automatic deviation correction control method for a hoisting system according to claim 1, characterized in that controlling the hoisting system to correct the deviation toward a center line comprising sending deviation rectification control commands to the hoisting system by using an industrial computer.

9. The automatic deviation correction control method for a hoisting system according to claim 1, characterized in that the hoisting system comprises a crane, which comprises a tire crane, a straddle carrier and a stacker.

* * * * *